United States Patent
Cho et al.

(10) Patent No.: US 11,495,787 B2
(45) Date of Patent: Nov. 8, 2022

(54) METHOD OF PREPARING ELECTRODE USING CURRENT COLLECTOR HAVING THROUGH-PORES OR HOLES

(71) Applicant: LG Chem, Ltd., Seoul (KR)

(72) Inventors: Hyung Man Cho, Daejeon (KR); Sol Nip Lee, Daejeon (KR); Song Taek Oh, Sejong (KR); Hyeok Moo Lee, Sejong (KR)

(73) Assignee: LG Energy Solution, Ltd.

( * ) Notice: Subject to any disclaimer, the term of this patent is extended or adjusted under 35 U.S.C. 154(b) by 420 days.

(21) Appl. No.: 15/774,181

(22) PCT Filed: Aug. 28, 2017

(86) PCT No.: PCT/KR2017/009367
§ 371 (c)(1),
(2) Date: May 7, 2018

(87) PCT Pub. No.: WO2018/044013
PCT Pub. Date: Mar. 8, 2018

(65) Prior Publication Data
US 2018/0331351 A1  Nov. 15, 2018

(30) Foreign Application Priority Data
Sep. 1, 2016  (KR) .......... 10-2016-0112444

(51) Int. Cl.
*H01M 4/139* (2010.01)
*H01M 4/36* (2006.01)
(Continued)

(52) U.S. Cl.
CPC ......... *H01M 4/139* (2013.01); *H01M 4/0404* (2013.01); *H01M 4/366* (2013.01);
(Continued)

(58) Field of Classification Search
None
See application file for complete search history.

(56) References Cited

U.S. PATENT DOCUMENTS

2006/0249239 A1* 11/2006 Krauss .................. B41C 1/05
156/59
2009/0239139 A1* 9/2009 Kozuki ............... H01M 10/286
429/161

(Continued)

FOREIGN PATENT DOCUMENTS

JP   H10172539 A   6/1998
JP   3850977 B2   11/2006

(Continued)

OTHER PUBLICATIONS

Search report from International Application No. PCT/KR2017/009367, dated Dec. 11, 2017.
(Continued)

*Primary Examiner* — Zhongqing Wei
(74) *Attorney, Agent, or Firm* — Lerner, David, Littenberg, Krumholz & Mentlik, LLP

(57) ABSTRACT

A method of preparing an electrode for a secondary battery, including:
(i) a process of preparing a current collector in which through-pores or holes are formed and an electrode slurry containing an electrode active material;
(ii) a process of bringing a shielding film into close contact with one surface of the current collector to shield pores or holes on the one surface of the current collector;
(iii) a process of coating the electrode slurry on the other surface of the current collector to which the shielding film is not attached, and primarily drying to prepare an interim electrode;
(iv) a process of removing the shielding film from the interim electrode; and (Continued)

(v) a process of secondarily drying the interim electrode to prepare the electrode.

12 Claims, 4 Drawing Sheets

(51) Int. Cl.
    *H01M 4/62*     (2006.01)
    *H01M 10/0525*     (2010.01)
    *H01M 4/74*     (2006.01)
    *H01M 4/04*     (2006.01)
    *H01M 4/02*     (2006.01)

(52) U.S. Cl.
    CPC ............. *H01M 4/621* (2013.01); *H01M 4/74* (2013.01); *H01M 10/0525* (2013.01); *H01M 2004/027* (2013.01); *H01M 2004/028* (2013.01)

(56) References Cited

U.S. PATENT DOCUMENTS

2009/0242507 A1     10/2009     Ando et al.
2009/0246629 A1*     10/2009     Nagai ..................... H01M 4/70
                                                             429/209
2012/0070736 A1     3/2012     Ohara et al.
2012/0135306 A1*     5/2012     Temmyo ................. H01M 4/80
                                                             429/211
2013/0022867 A1*     1/2013     Suzuki ................... H01M 4/13
                                                             429/211
2013/0252091 A1*     9/2013     Huang ................. H01M 4/131
                                                            429/211
2015/0125756 A1     5/2015     Kim et al.

FOREIGN PATENT DOCUMENTS

| | | |
|---|---|---|
| JP | 20060318709 A | 11/2006 |
| JP | 2010015974 A | 1/2010 |
| JP | 5403153 B2 | 1/2014 |
| KR | 19990085714 | 12/1999 |
| KR | 20000015320 A | 3/2000 |
| KR | 20130125592 A | 11/2013 |
| KR | 20130135101 A | 12/2013 |
| KR | 20140052075 A | 5/2014 |

OTHER PUBLICATIONS

Extended European Search Report for Application No. EP17846938 dated Oct. 8, 2018.

\* cited by examiner

PRIOR ART

FIG. 4
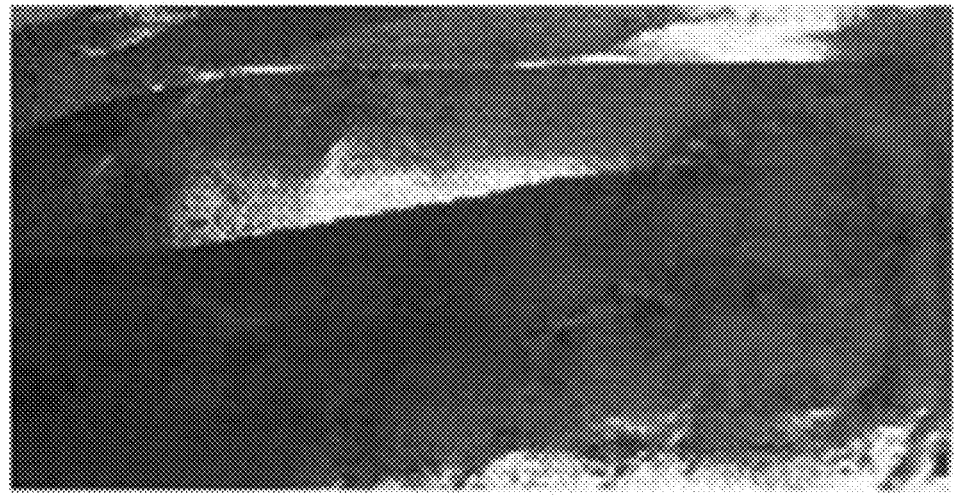
COMPARATIVE EXAMPLE1
EXAMPLE1

METHOD OF PREPARING ELECTRODE USING CURRENT COLLECTOR HAVING THROUGH-PORES OR HOLES

CROSS-REFERENCE TO RELATED APPLICATIONS

This application is a national phase entry under 35 U.S.C. § 371 of International Application No. PCT/KR2017/009367 filed on Aug. 28, 2017, which claims priority to Korean Patent Application No. 10-2016-0112444 filed on Sep. 1, 2016, which is incorporated herein by reference.

TECHNICAL FIELD

The present disclosure relates to a method of preparing an electrode using a current collector in which through-pores or holes are formed.

BACKGROUND ART

As the technical development of and the demand on mobile devices increase, the demand on secondary batteries as an energy source has rapidly increased, and use of the secondary batteries as a power source for electric vehicles (EVs) and hybrid electric vehicles (HEVs) has been recently realized. Among such secondary batteries, the demand for lithium secondary batteries with high energy density, high discharge voltage and output stability is high.

In particular, lithium secondary batteries used as a power source for EVs and HEVs require characteristics of high energy density and high output in a short time.

Generally, lithium secondary batteries are prepared using materials capable of intercalating and deintercalating lithium ions as a negative electrode and a positive electrode, and a space between the positive electrode and the negative electrode is filled with an organic electrolyte solution or a polymer electrolyte solution. Electrical energy is generated by an oxidation reaction when lithium ions are intercalated into the positive electrode and a reduction reaction when lithium ions are deintercalated from the negative electrode.

In this case, each of the negative electrode and the positive electrode include an electrode mixture layer on an electrode current collector. For example, a slurry is prepared by mixing and stirring an electrode active material with a binder and a solvent, and a conductive material and a dispersant as necessary, and then the mixture is coated on a metal current collector, compressed, and dried to prepare the electrodes.

Since the lithium secondary battery has been widely applied to EVs and the like in a preparation process of such electrodes, development of a high capacity battery is required, and thus a loading amount of the electrode mixture layer has been increased. However, an increased volume and weight of the electrode mixture layer reduce an energy density of the entire secondary battery and cause non-uniformity of an electrochemical reaction inside the electrode mixture layer.

Further, when a current or a voltage is applied to a battery, a concentration gradient of lithium ions in an electrode is generated, and this phenomenon is especially further intensified in a thick electrode mixture layer, resulting in degradation of rapid charging characteristics.

Thus, in order to solve the above described problem, it has been possible to simulate capacity of a secondary battery having a thick electrode mixture layer by laminating multiple layers of a thin electrode instead of applying a thick electrode mixture layer on one current collector. However, in this case, it is absolutely necessary for a current collector in which pores with a specific porosity or more or openings with a specific opening ratio or more are formed to preserve movement of lithium ions.

Furthermore, the current collector in which the pores or the openings are formed can significantly reduce an overall weight of a secondary battery, and thus future use thereof is expected to increase.

However, as shown in FIG. 1, when a slurry is coated on a current collector during processes of preparing electrodes, due to a high porosity or opening ratio, the slurry may leak to a surface opposite a coating surface, and thus a surface of an electrode mixture layer may become non-uniform and the electrode mixture layer cannot be uniformly formed.

Therefore, there is an urgent need for a technique through which a uniform electrode mixture layer can be formed while a current collector in which pores or holes are formed is used.

Disclosure

Technical Problem

The present disclosure has been made to solve the above-described problems of the related art and technical problems which were identified in the past.

The inventors of the present application have conducted intensive research and various experiments and have found that a uniform electrode mixture layer may be formed even when a current collector in which pores or holes are formed is used in a case in which an electrode is prepared in a manner through which, before coating an electrode slurry, a shielding film is brought into close contact with one surface of a current collector on which the electrode slurry is not coated, and after coating the electrode slurry, the electrode slurry is primarily dried at a relatively low temperature to form an interim electrode, and secondarily dried at a relatively high temperature after removing the shielding film, resulting in the electrode being prepared. Accordingly, the present disclosure was completed.

Technical Solution

The present disclosure provides a method of preparing an electrode for a secondary battery, including:

(i) a process of preparing a current collector in which through-pores or holes are formed and an electrode slurry containing an electrode active material;

(ii) a process of bringing a shielding film into close contact with one surface of the current collector to shield pores or holes on the one surface of the current collector;

(iii) a process of coating the electrode slurry on the other surface of the current collector to which the shielding film is not attached, and primarily drying to prepare an interim electrode;

(iv) a process of removing the shielding film from the interim electrode; and (v) a process of secondarily drying the interim electrode to prepare the electrode.

That is, before the electrode slurry is coated on the current collector, the shielding film is brought into close contact with the one surface of the current collector on which the electrode slurry is not coated, then the electrode slurry is coated on the other surface of the current collector, and thus the electrode slurry is prevented from leaking to the surface opposite the coating surface. Therefore, the coating surface of the electrode slurry may be coated uniformly, and a loading amount of the electrode may be accurately controlled throughout the electrode.

In other words, in the method of preparing an electrode according to the present disclosure, the shielding film is utilized as a mask configured to shield the through-pores or holes formed in the current collector.

Generally, the higher a porosity of the pores or an opening ratio of the holes formed in the current collector, the better performance of a battery, such as an output characteristic, is due to smooth movement of lithium ions. However, a surface of the electrode mixture layer is not uniformly formed at a time at which electrodes are prepared, and thus it is difficult to make the porosity or opening ratio be a predetermined value or more.

However, according to the preparing method of the present disclosure, since an electrode slurry does not leak to the opposite surface of a coating surface when electrodes are being prepared, and an electrode mixture layer may be formed uniformly, a current collector having a high opening ratio or porosity may be used without being subjected to such conventional limitations.

Specifically, the current collector is not limited as long as through-pores or holes are formed therein, and the current collector may specifically be a metal foamed body having a porosity of 50 to 98%, a metal fiber body having a porosity of 50 to 95%, or a metal foil having an opening ratio of 15 to 70%. More specifically, the current collector may be a metal foamed body having a porosity of 70 to 98%, a metal fiber body having a porosity of 70 to 95%, or a metal foil having an opening ratio of 50 to 70%.

Here, the porosity is calculated by comparing a density of the current collector with respect to the metal on which pores are not formed and calculating a volume ratio, and the opening ratio is obtained by roughly calculating an overall volume of the holes in the current collector with respect to a total volume of the metal foil on which holes are not formed.

When the porosity of the metal foamed body or the metal fiber body exceeds the above range or is less than 50%, sufficient mobility of lithium ions may not be secured in a case in which a plurality of layers of thin electrodes are laminated to achieve high loading. When the porosity of the metal foamed body and the porosity of the metal fiber body exceeds 98% and 95%, respectively, which is beyond the above range, a solid content of the electrode mixture layer formed on the current collector may easily fall from the current collector or may not be sufficiently strong enough to support the electrode mixture layer, which is not desirable. The same problem occurs even when the opening ratio of the metal foil is beyond the above range, which is also not preferable. However, as the hole is larger in diameter than the pore, strength of the hole is more rapidly weakened according to the formation of hole, and thus a preferred range of the opening ratio is smaller than that of the porosity, as defined above.

In one specific example, an average diameter of the pores may be 0.1 μm to 10 μm, and may specifically be 0.1 μm to 1 μm, and an average interval between the pores may be 0.1 μm to 1 μm, and may specifically be 0.1 μm to 0.5 μm.

Here, the average diameter and the average interval are values obtained by arbitrarily determining a certain area, calculating sizes of pores existing within the area and intervals between the pores, and then averaging the sizes and the intervals, respectively.

When the average diameter of the pores is too small or the average interval between the pores is too large and exceeds the above range, it is difficult to have a desired porosity, and thus it is difficult to manufacture an electrode as described above. When the average diameter of the pores is too large or the average interval between the pores is too small, strength of the current collector itself is weak and it is difficult to support the electrode mixture layer, which is not preferable.

For the same reasons, the diameter of the holes may be 0.01 mm to 1 mm, and may specifically be 0.03 mm to 0.1 mm, and the average interval between the holes may be 0.01 mm to 1 mm, and may specifically be 0.03 mm to 0.1 mm.

As described above, when the current collector has pores or holes, a thickness of the current collector may be larger than that of a conventional metal foil current collector, but this kind problem may be solved by, for example, rolling the prepared current collector.

The current collector according to the present disclosure may have a thickness of 10 μm to 20 μm, and specifically, the thickness differs according to a metal forming a current collector, for example, about 20 μm in a case of aluminum mainly used for a positive electrode, and about 10 μm in a case of copper mainly used in a negative electrode.

When a thickness of a current collector is too thick and exceeds the above range, an overall volume of an electrode assembly is increased, which is not preferable. When a thickness of the current collector is too thin and departs from the above range, the current collector may not have enough strength to support an electrode mixture layer, which is not preferable.

On the other hand, a shielding film which is in close contact with one surface of a current collector to serve as a mask is not limited as long as the shielding film has enough of a shielding property that a material of an electrode slurry does not leak and chemical resistance to not react with these materials. Specifically, the shielding film may be a paraffin-based resin film, which is composed of hydrocarbon or highly saturated hydrocarbon and is weak in reactivity and resistant to chemicals, and more particularly, may be a parafilm for ease of processing.

Here, the parafilm is composed of a paraffin mixture of various molecular weights and has remarkable elongation, malleability, waterproofness, and little stickiness, is a material mainly used when sealing test tubes, petri dishes, beakers, or the like in a laboratory, and is very suitable to play a role as a mask.

The method of bringing such a shielding material into close contact with the current collector is not limited, but specifically, may be performed by roll pressing to flatly attach the material to a current collector having pores or holes without any wrinkles.

However, since the shielding material may be made of a thermoplastic resin, deformation due to heat may exist. Therefore, when an electrode slurry is coated on a current collector and dried, it is necessary to temporarily dry the electrode slurry at a temperature lower than that of the shielding material for a shorter time to form an interim electrode in a shape in which part of the solvent of the electrode slurry is volatilized and hardened to some extent, and then remove the shielding film and re-dry the electrode slurry.

Accordingly, the present disclosure includes a primary drying process and a secondary drying process as described above.

The primary drying process is a process in which an electrode slurry is hardened to some extent before removing a film. Therefore, the primary drying is performed for a short period of time at a temperature at a melting point of a resin constituting the shielding film or less or at a similar temperature, and, for example, may be performed in a range of 30 to 60° C. for 5 to 15 minutes, and may specifically be performed in a range of 40 to 50° C. for 5 to 10 minutes.

The secondary drying process is the same process as a drying process in a conventional electrode preparing process, and is a process in which a solvent of an electrode slurry is completely volatilized and hardened. Therefore, the secondary drying may be performed under the same conditions as the conventional drying process, for example, in a range of 60 to 120° C., for more than 20 hours, and specifically in a range of 80 to 110° C. for 24 hours to 48 hours.

A process of removing a shielding film is required between the primary drying process and the secondary drying process. The process of removing the shielding film is not limited, and may be a process of carefully peeling the shielding film so that the electrode slurry which is not yet completely hardened does not flow together with the film.

On the other hand, in a case in which an electrode is prepared according to the above process, the prepared electrode is in a form in which an electrode mixture layer is formed on only one surface of a current collector.

Therefore, in order to form an electrode mixture layer on both surfaces of the current collector, for example, a process of coating an electrode slurry on one surface of the current collector from which a shielding film is removed may further be included between the electrode manufacturing process (iv) and the process (v).

In the additionally included process of coating the electrode slurry, the electrode slurry does not leak to a surface opposite a coating surface due to an electrode slurry layer of an interim electrode which is previously formed on the one surface of the current collector during the above-described processes (i) to (iv). Therefore, both of the electrode mixture layers formed on both of the surfaces of the current collector may have a uniform coating surface, and thus an electrode loading amount may be accurately controlled throughout the electrode.

Meanwhile, the electrode slurry coated on the current collector in this manner may further include a binder and/or a conductive material together with the electrode active material which expresses the capacity.

The current collector and the electrode active material may be determined depending on a type of the electrode to be prepared, and may specifically be a positive electrode current collector and a positive electrode active material or a negative electrode current collector and a negative electrode active material, respectively.

The positive electrode current collector may be generally manufactured to a thickness of about 3 to 500 μm. For the positive electrode current collector, a material not inducing the chemical change and having a high conductivity may be used without limitation. Examples of the positive electrode current collector and the extended current collect part may include stainless steel, aluminum, nickel, titanium, baked carbon, or aluminum or stainless steel surface-treated with carbon, nickel, titanium, silver, etc. The positive electrode current collector may have fine irregularities on the surface thereof to increase an adhesiveness of the positive electrode active material, and may have various shapes such as a film, a sheet, a foil, a net, a porous body, a foam, and a non-woven fabric, etc.

Examples of the positive electrode active material may include, for example, a layered compound of lithium cobalt oxide ($LiCoO_2$), lithium nickel oxide ($LiNiO_2$), etc. or a substituted compound with one or more transition metals; lithium manganese oxide such as $Li_{1+x}Mn_{2-x}O_4$ (in which x is 0 to 0.33), $LiMnO_3$, $LiMn_2O$, $LiMnO_2$, etc.; lithium copper oxide ($Li_2CuO_2$); vanadium oxide such as $LiV_3O_8$, $LiFe_3O_4$, $V_2O_5$, $CuZV_2O_7$, etc.; Ni site-type lithium nickel oxide represented by Chemical Formula of $LiNi1-xMxO_2$ (in which, M=Co, Mn, Al, Cu, Fe, Mg, B or Ga, x=0.01 to 0.3); lithium manganese complex oxide represented by Chemical Formula $LiMn_2-xMxO_2$ (in which M=Co, Ni, Fe, Cr, Zn or Ta, and x=0.01 to 0.1) or $Li_2Mn_3MO_8$ (in which, M=Fe, Co, Ni, Cu or Zn); spinel-structured lithium manganese composite oxide represented by $LiNixMn_2-xO_4$; $LiMn_2O_4$ in which a portion of Li is substituted with alkaline earth metal ions; a disulfide compound; $Fe_2(MoO_4)_3$, and the like. However, the present disclosure may not be limited thereof.

The negative electrode current collector may be generally manufactured to a thickness of about 3 to 500 μm. For the negative electrode current collector, a material not inducing chemical change and having conductivity may be used without limitation. Examples of the negative electrode current collector and the extended current collect part may include copper, stainless steel, aluminum, nickel, titanium, baked carbon, or copper or stainless steel surface-treated with carbon, nickel, titanium, silver, etc., aluminum-cadmium ally, etc. Further, similarly to the positive electrode current collector, the negative electrode current collector and/or the extended current collect part may have fine irregularities on the surface thereof to increase an adhesiveness of the negative electrode active material, and may have various shapes such as a film, a sheet, a foil, a net, a porous body, a foam, and a non-woven fabric, etc.

As the negative electrode active material, for example, there may be used carbon, such as non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; a metal oxide, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, or $Bi_2O_5$; conductive polymer, such as polyacetylene; or a Li—Co—Ni based material; titanium oxide; lithium titanium oxide, etc.

The conductive agent is generally added so that the conductive agent has 1 to 30 wt % based on the total weight of the slurry including the electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, thermal black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive agent.

The binder is a component assisting in binding between the active material and conductive agent and in binding with the current collector. The binder is generally added in an amount of 1 to 30 wt % based on the total weight of the slurry including the electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

Further, the electrode slurry may include the filler, and the filler is an optional component used to inhibit expansion of the positive electrode. There is no particular limit to the filler so long as the filler does not cause chemical changes in a battery to which the filler is applied, and is made of a fibrous material. As examples of the filler, there may be used olefin polymers, such as polyethylene and polypropylene; and fibrous materials, such as glass fiber and carbon fiber.

The present disclosure also provides an electrode for a secondary battery prepared according to the above method, and the electrode thus prepared may have the electrode mixture containing electrode active materials, in part or all of the pores or through-pores of the current collector, and a coating height of the electrode mixture applied on the current collector may be uniform.

That is, the electrode according to the present disclosure may have a uniform electrode mixture layer as compared with the conventional preparing method using current collectors same with those used in the present disclosure. As a result, non-uniformity of the electrochemical reaction in the electrode mixture layer may be prevented, thereby improving performance of an overall secondary battery.

The present disclosure also provides a lithium secondary battery including the electrode, a battery pack using the lithium secondary battery as a unit battery, and a device including the battery pack.

Specific examples of the device may include a small size device such as a computer, a mobile phone, a power tool, and a medium and large size device such as a power tool powered by an electric motor; an electric vehicle including an electric vehicle (EV), a hybrid electric vehicle (HEV), a plug-in hybrid electric vehicle (PHEV), etc.; an electric motorcycle including an electric bike (E-bike) and electric scooter (E-scooter); an electric golf cart; power storage systems and etc., but the present disclosure is not limited thereto.

In addition, a method of manufacturing a lithium secondary battery and a method of manufacturing a battery pack and etc. are well known in the art, so a description thereof will be omitted in the present disclosure.

Advantageous Effects

As described above, a method of preparing an electrode for a secondary battery according to the present disclosure can form a uniform electrode mixture layer even when a current collector having pores or holes is used, by a process in which, before coating an electrode slurry, a shielding film is brought into close contact with one surface of a current collector on which the electrode slurry is not yet coated, the electrode slurry is then coated on the current collector and primarily dried at a relatively low temperature to form an interim electrode, and the shielding film is then removed and secondarily dried at a relatively high temperature. Accordingly, the method of preparing an electrode for a secondary battery according to the present disclosure may prevent non-uniformity of an electrochemical reaction in an electrode mixture layer, thereby improving performance of an overall secondary battery.

BRIEF DESCRIPTION OF THE DRAWINGS

FIG. 4 is a photograph of a surface of electrodes according to Experimental Example 1.

DETAILED DESCRIPTION OF THE PREFERRED EMBODIMENTS

Hereinafter, exemplary embodiments of the present disclosure will be described in detail with reference to the drawings, which are for easing understanding of the present disclosure, and the scope of the present disclosure is not limited thereto.

Figure 1:
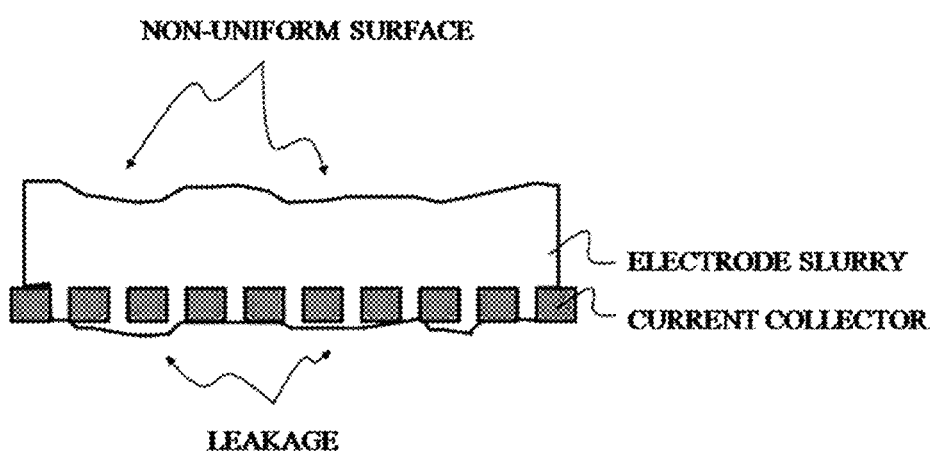
FIG. 1 is a schematic diagram of an electrode for a secondary battery prepared according to the related art.
Figure 2:
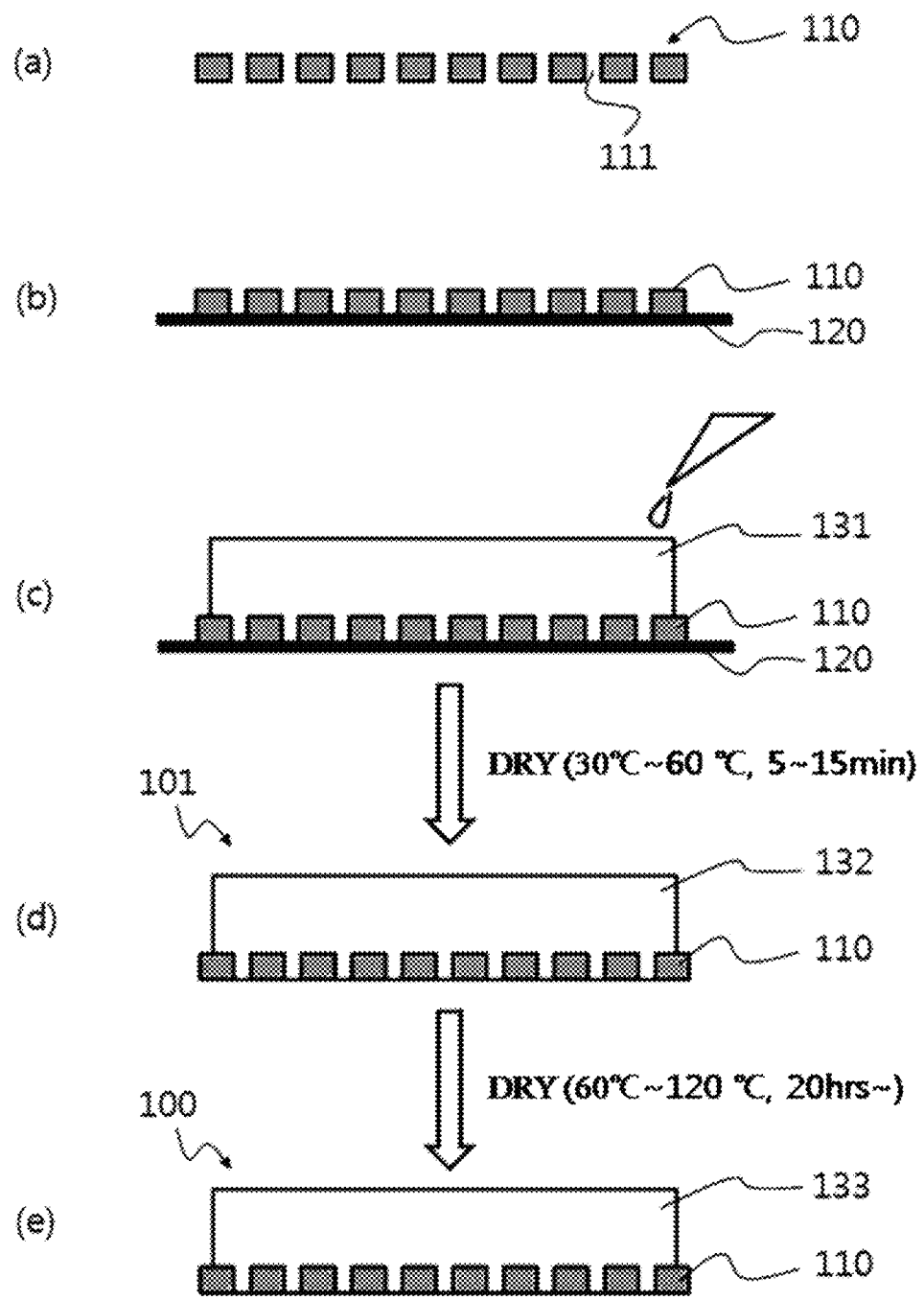
FIG. 2 is a schematic diagram showing a method of preparing an electrode for a secondary battery according to one embodiment of the present disclosure.

FIG. 2 is a schematic diagram showing a method of preparing an electrode for a secondary battery according to one embodiment of the present disclosure.

Referred to FIG. 2, a current collector 110 having a plurality of through-holes 111 is prepared (step (a)). A shielding film 120 is brought into close contact with one surface of the current collector 110 to shield the holes 111 from the one surface (step (b)).

The method of bringing such a shielding film 120 into close contact with the current collector 110 is not limited, but specifically, may be performed by roll pressing.

Thereafter, an electrode slurry 131 including an electrode active material is applied on the other surface of the current collector 110 to which the shielding film 120 is not attached (step (c)).

In a case where the shielding film 120 is attached to shield the holes 111 to the surface opposite to the surface to be coated with the electrode slurry 131 before the electrode slurry 131 is applied, the electrode slurry 131 does not leak to the opposite surface of the coated surface through the holes 111 because the surface is shielded with the shielding film 120 and thus the electrode slurry 131 may be coated so as to have a uniform surface.

After the electrode slurry is completely applied, the electrode slurry is dried at a temperature of about 30 to 60° C. for about 5 to 15 minutes to form an interim electrode 101, and the shielding film 120 is removed from the interim electrode 101 (step (d)).

The drying may be carried out to prevent the hardened electrode slurry 132 from leaking through the holes 111 even after the shielding film 120 is removed by volatilizing a solvent of the electrode slurry 131 to some extent before removing the shielding film 120. However, since a thermoplastic resin may be used as the shielding film 120, in order to prevent deformation due to heat, the electrode slurry 131 is primarily dried at a relatively low temperature for a short time to harden the electrode slurry 131.

After removing the shielding film 120 from the interim electrode 101, the electrode slurry is secondarily dried at a temperature of about 60 to 120° C., which is higher than the above-mentioned drying temperature, for 20 hours or more to volatilize the all of the solvent in the electrode slurry and to prepare an electrode 100 having an electrode mixture layer on the current collector 110 (step (e)).

The electrode 100 thus prepared may have the electrode mixture 133 containing electrode active materials in part or all of the holes 111 of the current collector 110, and a coating height of the electrode mixture 133 applied on the current collector 111 may be uniform.

Figure 3:
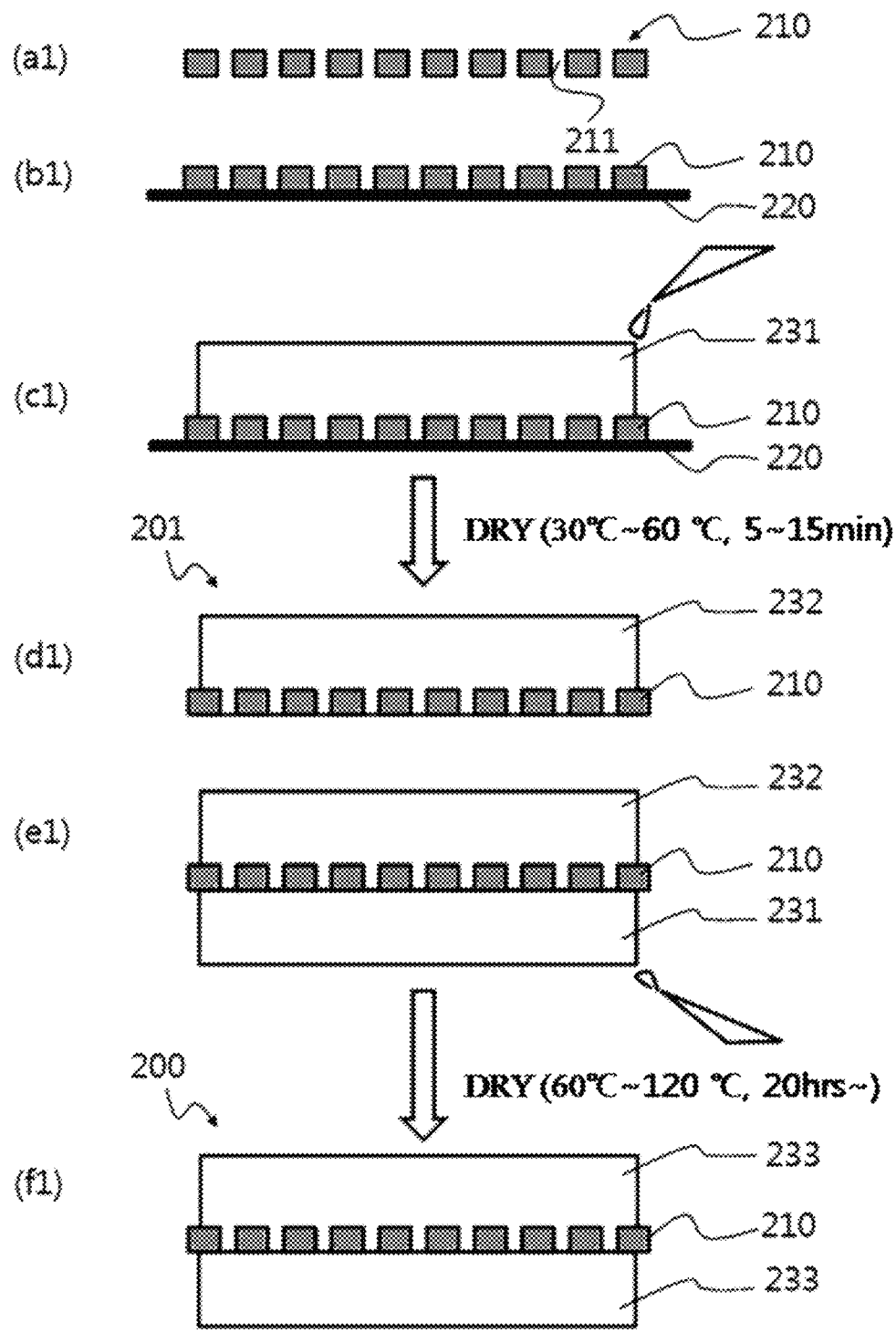
FIG. 3 is a schematic diagram showing a method of preparing an electrode for a secondary battery according to another embodiment of the present disclosure.

FIG. 3 is a schematic diagram showing a method of preparing an electrode for a secondary battery according to another embodiment of the present disclosure.

Referred to FIG. 3, as compared with FIG. 2, the processes (a1) to (d1) are the same as the processes from (a) to (d) of FIG. 2.

In particular, the current collector 210 in which a plurality of through-holes 211 are formed is prepared (step (a1)). The shielding film 220 is brought into close contact with one surface of the current collector 210 to shield the holes 211 from one surface (step (b1)).

Of course, the method of bringing such a shielding film 220 into close contact with the current collector 110 is not limited, but specifically, may be performed by roll pressing.

Thereafter, the electrode slurry 231 including the electrode active material is applied to the other surface of the current collector 210 to which the shielding film 220 is not attached (step (c1)), and after the electrode slurry 231 is completely applied, the electrode slurry is dried at a temperature of about 30 to 60° C. for about 5 to 15 minutes to form the interim electrode 201 having electrode slurry 232 in which the solvent is partially volatilized to have a predetermined hardness, and the shielding film 220 is removed from the interim electrode 201 (step (d1)).

The process thereafter differs from that of FIG. 2, in particular, the electrode slurry 231 including the electrode active material is further applied on the surface of the current collector 210 on which the electrode slurry was not formed, that is, the surface of the current collector to which the shielding film 220 was previously attached (step (e1)), and is dried at a temperature of about 60 to 120° C., which is higher than the above-mentioned drying temperature, for 20 hours or more to volatilize the electrode slurry and all of the solvent in the electrode slurry and to prepare the electrode 200 having the electrode mixture layers on both surfaces of the current collector 210 (step (f1)).

In the additional coating process (e1) of the electrode slurry 231, the electrode slurry 231 does not leak to the opposite surface of the coating surface because of the electrode slurry layer 232 of the interim electrode 201 formed on one surface of the current collector 210.

The electrode 200 prepared by the above process has the electrode mixture 233 containing the electrode active material in the all of the holes 211 of the current collector, and also has uniform coated surfaces on both sides of the current collector.

Hereinafter, the present disclosure will be described in detail with reference to examples of the present disclosure, but the scope of the present disclosure is not limited thereto.

Example 1

A parafilm was attached to one surface of a copper foil having an opening ratio of 50%, a hole diameter of 0.05 mm, a hole interval of 1 mm, and a thickness of 20 μm through a roll press method and masked.

Graphite as a negative electrode active material, denka black as a conductive material, and polyvinylidene fluoride as a binder were mixed at a weight ratio of 96:2:2, and the resulting mixture was added to N-methyl pyrrolidone (NMP) to prepare a slurry, and the slurry was then applied at 2.44 mAh/cm² to the other surface of the copper foil to which the parafilm was not attached.

Thereafter, an electrode coated with the slurry was placed in an oven, dried at 45° C. for 10 minutes, taken out, and the parafilm was slowly removed.

The electrode from which the parafilm was removed was again placed in the oven and dried at 80° C. for 24 hours.

Comparative Example 1

Graphite as a negative electrode active material, denka black as a conductive material, and polyvinylidene fluoride as a binder were mixed at a weight ratio of 96:2:2, and the resulting mixture was added to N-methyl pyrrolidone (NMP) to prepare a slurry, and then the slurry was applied at 2.44 mAh/cm² to one surface of a copper foil having an opening ratio of 50%, a hole diameter of 0.05 mm, and a thickness of 20 μm.

Thereafter, an electrode coated with the slurry was placed in an oven and dried at 80° C. for 24 hours.

Experimental Example 1

Comparison of Electrode Surfaces

Photographs of surfaces of the electrodes prepared in Example 1 and Comparative Example 1 are illustrated in FIG. 4.

As can be seen from FIG. 4, the surface of the electrode according to Example 1 is uniform, but the surface of the electrode according to Comparative Example 1 is non-uniform, and it can be seen that the electrodes may not be capable of controlling the same electrode loading.

It should be understood by those skilled in the art that various changes may be made without departing from the spirit and scope of the present disclosure.

The invention claimed is:

1. A method of preparing an electrode for a secondary battery, comprising:
   (i) preparing a current collector in which through-pores or holes are formed;
   (ii) roll pressing a shielding film to bring the shielding film into close contact with one surface of the current collector to shield the through-pores or holes on the one surface of the current collector, wherein the shielding film is parafilm;
   (iii) coating an electrode slurry on the other surface of the current collector to which the shielding film is not attached, and primarily drying in a range of 30° C. to 60° C. for 5 minutes to 15 minutes to prepare an interim electrode;
   (iv) removing the shielding film from the interim electrode; and
   (v) secondarily drying the interim electrode in a range of 60° C. to 120° C. for more than 20 hours to prepare the electrode.

2. The method of claim 1, wherein the current collector is a metal foamed body having a porosity of 50% to 98%, a metal fiber body having a porosity of 50% to 95%, or a metal foil having an opening ratio of 15% to 70%.

3. The method of claim 2, wherein the porosity of the metal foamed body is from 70% to 98% or the porosity of the metal fiber body is from 70% to 95%.

4. The method of claim 2, wherein the opening ratio of the metal foamed body is from 50% to 70%.

5. The method of claim 1, wherein the current collector has a thickness of 10 μm to 20 μm.

6. The method of claim 1, wherein an average diameter of the through-pores is 0.1 μm to 10 μm.

7. The method of claim 1, wherein the diameter of the holes is 0.01 mm to 1 mm.

8. The method of claim 1, wherein an average interval between the through-pores is 0.1 μm to 1 μm.

9. The method of claim 1, wherein the average interval between the holes is 0.01 mm to 1 mm.

10. The method of claim 1, wherein the electrode slurry further comprises a binder and/or a conductive material.

11. The method of claim 1, wherein between (iv) the removing the shielding film from the interim electrode and (v) the secondarily drying the interim electrode, further comprising coating the electrode slurry on one surface of the current collector from which the shielding film is removed.

12. The method of claim 1, wherein in (iii) the coating the electrode slurry on the other surface of the current collector to which the shielding film is not attached, the electrode slurry is in all of the through-pores or holes of the current collector.

* * * * *